(12) United States Patent
Tang et al.

(10) Patent No.: US 7,821,724 B2
(45) Date of Patent: Oct. 26, 2010

(54) PHOTOGRAPHING OPTICAL LENS ASSEMBLY

(75) Inventors: Hsiang-Chi Tang, Taichung (TW);
 Tsung-Han Tsai, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 0 days.

(21) Appl. No.: 12/406,357

(22) Filed: Mar. 18, 2009

(65) Prior Publication Data
 US 2010/0182707 A1 Jul. 22, 2010

(30) Foreign Application Priority Data
 Jan. 22, 2009 (TW) .............................. 98102508 A (51) Int. Cl.
 *G02B 3/02* (2006.01)
 *G02B 13/18* (2006.01)
(52) U.S. Cl. ....................................... 359/717; 359/795
(58) Field of Classification Search ................. 359/717, 359/793, 795
 See application file for complete search history.

(56) References Cited
 U.S. PATENT DOCUMENTS
 7,463,433 B2 12/2008 Tang

2004/0136098 A1 * 7/2004 Saito et al. ................... 359/793
2006/0221467 A1 * 10/2006 Chen et al. ................... 359/717

* cited by examiner

Primary Examiner—Darryl J Collins
(74) Attorney, Agent, or Firm—Birch, Stewart, Kolasch & Birch, LLP (57) ABSTRACT

The present invention provides a photographing optical lens assembly comprising, in order from the object side to the image side: a first lens element with positive refractive power having a convex object-side surface and a concave image-side surface, the object-side and image-side surfaces thereof being aspheric; a second lens element with negative refractive power having a concave object-side surface and a convex image-side surface, the object-side and image-side surfaces thereof being aspheric; and an aperture stop located in front of the first lens element; wherein an Abbe number of the first lens element is V1, an Abbe number of the second lens element is V2, and they satisfy the relation: $|V1-V2|<15$; and wherein the number of the lens elements of the photographing optical lens assembly is limited to two. Such an arrangement of optical elements can effectively reduce the volume of the lens assembly and the sensitivity of the optical system and enable the lens assembly to obtain a higher resolution.

17 Claims, 13 Drawing Sheets

TABLE 1

(Embodiment 1)

f= 2.69 mm, Fno = 2.85, HFOV= 28.0 deg.

| Surface# | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.140 | | | | |
| 2 | Lens 1 | 0.74399 (ASP) | 0.609 | Plastic | 1.543 | 56.5 | 2.25 |
| 3 | | 1.35320 (ASP) | 0.381 | | | | |
| 4 | Lens 2 | -2.01364 (ASP) | 0.984 | Plastic | 1.543 | 56.5 | -69.59 |
| 5 | | -2.49283 (ASP) | 0.100 | | | | |
| 6 | IR-filter | Plano | 0.300 | Glass | 1.517 | 64.2 | - |
| 7 | | Plano | 0.100 | | | | |
| 8 | Cover-glass | Plano | 0.400 | Glass | 1.517 | 64.2 | - |
| 9 | | Plano | 0.298 | | | | |
| 10 | Image | Plano | | | | | |

Fig.7

TABLE 2

| Aspheric Coefficients | | | | |
|---|---|---|---|---|
| Surface # | 2 | 3 | 4 | 5 |
| k = | 1.70265E-02 | 3.27364E+00 | -1.65426E+00 | -9.48046E+01 |
| A4 = | -1.53893E-02 | 3.21117E-01 | -6.44035E-01 | -4.88072E-01 |
| A6 = | 7.24547E-01 | -2.37792E+00 | 9.01075E-01 | 7.82659E-01 |
| A8 = | -5.13878E+00 | 4.04058E+01 | -2.41733E+01 | -1.27660E+00 |
| A10= | 2.04716E+01 | -2.44885E+02 | 1.24706E+02 | 1.05338E+00 |
| A12= | -2.87201E+01 | 6.64580E+02 | -3.11221E+02 | -3.93540E-01 |

Fig.8

TABLE 3

(Embodiment 2)

f= 4.17 mm, Fno = 2.85, HFOV = 29.8 deg.

| Surface# |  | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.233 | | | | |
| 2 | Lens 1 | 1.22900 (ASP) | 0.995 | Plastic | 1.543 | 56.5 | 3.50 |
| 3 |  | 2.48431 (ASP) | 0.748 | | | | |
| 4 | Lens 2 | -5.18190 (ASP) | 1.615 | Plastic | 1.543 | 56.5 | -12.38 |
| 5 |  | -25.03180 (ASP) | 0.100 | | | | |
| 6 | IR-filter | Plano | 0.300 | Glass | 1.517 | 64.2 | - |
| 7 |  | Plano | 0.100 | | | | |
| 8 | Cover-glass | Plano | 0.400 | Glass | 1.517 | 64.2 | - |
| 9 |  | Plano | 0.388 | | | | |
| 10 | Image | Plano | | | | | |

Fig.9

TABLE 4

| Aspheric Coefficients | | | | |
|---|---|---|---|---|
| Surface # | 2 | 3 | 4 | 5 |
| k = | -8.07613E-01 | -8.08948E+01 | -5.00000E+02 | -5.00000E+02 |
| A4 = | 4.82882E-02 | 6.26735E-01 | -4.16762E-01 | -6.17270E-03 |
| A6 = | 7.40949E-02 | -1.79764E+00 | 9.29018E-01 | -4.80323E-02 |
| A8 = | -7.29439E-02 | 4.73039E+00 | -2.18516E+00 | 3.69503E-02 |
| A10= | 5.51808E-02 | -6.65888E+00 | 2.59043E+00 | -1.69605E-02 |
| A12= | 2.05618E-02 | 4.34602E+00 | -1.37793E+00 | 3.96743E-03 |
| A14= | | | | -3.87554E-04 |

Fig.10

TABLE 5

(Embodiment 3)

f = 3.53 mm, Fno = 2.85, HFOV = 32.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.155 | | | | |
| 2 | Lens 1 | 0.95031 (ASP) | 0.653 | Plastic | 1.544 | 55.9 | 3.02 |
| 3 | | 1.70737 (ASP) | 0.306 | | | | |
| 4 | | Plano | 0.331 | | | | |
| 5 | Lens 2 | -4.20500 (ASP) | 1.301 | Plastic | 1.544 | 55.9 | -29.37 |
| 6 | | -6.32870 (ASP) | 0.200 | | | | |
| 7 | IR-filter | Plano | 0.300 | Glass | 1.517 | 64.2 | - |
| 8 | | Plano | 0.200 | | | | |
| 9 | Cover-glass | Plano | 0.300 | Glass | 1.517 | 64.2 | - |
| 10 | | Plano | 0.385 | | | | |
| 11 | Image | Plano | | | | | |

Note: Clear aperture diameter on surface #4 is 1.23mm

Fig.11

TABLE 6

| Aspheric Coefficients | | | | |
|---|---|---|---|---|
| Surface # | 2 | 3 | 5 | 6 |
| k = | 3.93457E-02 | 3.79635E+00 | 7.29478E+00 | -1.42909E+03 |
| A4 = | 1.36714E-04 | 1.19012E-01 | -3.34752E-01 | -1.96907E-01 |
| A6 = | 2.36370E-01 | -3.70016E-01 | 9.88201E-01 | 2.28677E-01 |
| A8 = | -8.17494E-01 | 6.19697E+00 | -4.85476E+00 | -2.10968E-01 |
| A10= | 1.88196E+00 | -2.42469E+01 | 9.64411E+00 | 9.16567E-02 |
| A12= | -1.35360E+00 | 4.08243E+01 | -8.62830E+00 | -1.63108E-02 |

Fig.12

TABLE 7

|  | Embodiment 1 | Embodiment 2 | Embodiment 3 |
|---|---|---|---|
| f | 2.69 | 4.17 | 3.53 |
| Fno | 2.85 | 2.85 | 2.85 |
| HFOV | 28.0 | 29.8 | 32.5 |
| V1 | 56.5 | 56.5 | 55.9 |
| |V1-V2| | 0.0 | 0.0 | 0.0 |
| N1 | 1.543 | 1.543 | 1.544 |
| CT2/CT1 | 1.62 | 1.62 | 1.99 |
| T12/f | 0.14 | 0.18 | 0.18 |
| R1/R2 | 0.55 | 0.49 | 0.56 |
| R3/R4 | 0.81 | 0.21 | 0.66 |
| f/f1 | 1.20 | 1.19 | 1.17 |
| f/f2 | -0.04 | -0.34 | -0.12 |
| TTL/ImgH | 2.04 | 1.84 | 1.69 |

Fig.13

PHOTOGRAPHING OPTICAL LENS ASSEMBLY

BACKGROUND OF THE INVENTION

1. Field of the Invention

The present invention relates to a photographing optical lens assembly, and more particularly, to a compact photographing optical lens assembly used in a camera mobile phone.

2. Description of the Prior Art

In recent years, with the popularity of camera mobile phones, the demand for compact photographing lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and electronic devices have become more compact and powerful, there is an increasing demand for compact photographing lenses featuring better image quality.

In order to correct aberrations, a conventional mobile phone lens assembly usually takes the form of a triplet lens design, with the most commonly seen triplet type being positive, negative and positive. However, when the volume of the lens assembly is reduced, less space is available for the image forming system, making it difficult to fit the three lenses in the limited space. Therefore, the thickness of the lenses must be reduced, resulting in plastic-injection-molded lenses which have poor material homogeneity.

The miniaturized optical lens assembly disclosed in U.S. Pat. No. 7,463,433 comprises two plastic lens elements with refractive power, that is, a first lens with positive refractive power, and a second lens with negative refractive power are arranged in order from the object side to the image side. Though such an arrangement enables the optical lens assembly to obtain good resolution and maintain a compact form, but because the first lens is specified with two convex surfaces, the refractive power of each lens in the system has to be relatively stronger, resulting in an increase in the sensitivity of the optical system. Therefore, it may be difficult to control the yield of the lens assembly.

SUMMARY OF THE INVENTION

In order to obtain good image quality, effectively reduce the total track length of the lens assembly, maintain the miniaturization of the lens assembly and reduce the sensitivity of the optical system, the present invention provides a photographing optical lens assembly comprising two lens elements and an aperture stop.

A photographing optical lens assembly comprises, in order from the object side to the image side: a first lens element with positive refractive power having a convex object-side surface and a concave image-side surface, the object-side and image-side surfaces thereof being aspheric; a second lens element with negative refractive power having a concave object-side surface and a convex image-side surface, the object-side and image-side surfaces thereof being aspheric; and an aperture stop located in front of the first lens element. In the present photographing optical lens assembly, there are exactly two lens elements with refractive power. Such an arrangement of optical elements can effectively improve the image quality of the optical system, reduce the sensitivity of the optical system and maintain miniaturization of the lens assembly.

In the present photographing optical lens assembly, the first lens element is a meniscus lens element having a convex object-side surface and a concave image-side surface so that the astigmatism of the optical system may be better corrected, and the refractive power (of each lens element) of the optical system may be distributed more appropriately to reduce the sensitivity of the optical system; the second lens element with negative refractive power enables the principal point of the optical system to be positioned far away from the image plane, thereby the total track length of the optical system may be reduced to maintain the miniaturization of the lens assembly.

In the present photographing optical lens assembly, the refractive power of the optical system is mainly provided by the first lens element with positive refractive power, and the second lens element with negative refractive power serves as a correction lens to balance and correct various aberrations caused by the optical system. Moreover, the first lens element provides a strong positive refractive power, and the aperture stop is located near the object side of the photographing optical lens assembly, thereby the total track length of the photographing optical lens assembly may be reduced effectively. The aforementioned arrangement also enables the exit pupil of the photographing optical lens assembly to be positioned far away from the image plane. Therefore, the light will be projected onto the sensor at a nearly perpendicular angle, and this is the telecentric feature of the image side. The telecentric feature is very important to the photosensitive power of the current solid-state electronic sensor as it can improve the photosensitivity of the electronic sensor to reduce the probability of the occurrence of shading.

In the present photographing optical lens assembly, an Abbe number of the first lens element is V1, an Abbe number of the second lens element is V2, and they satisfy the relation: |V1−V2|<15.

When V1 and V2 satisfy the above relation, astigmatism and Coma caused by the optical system can be more effectively corrected, improving the resolution of the photographing optical lens assembly.

With the trend toward miniaturization of lens assemblies for mobile phone cameras and the requirement of having a wide field of view, the focal length of the optical system is becoming shorter, thus the radius of curvature and the size of the lens elements must become very small. As it is difficult to produce such glass lens elements through conventional grinding, plastic material is introduced to produce high-precision lens elements through injection molding at a relatively low cost. Additionally or alternatively, glass molding method may be employed to produce high-precision glass lens elements. The surfaces of the lens elements are formed to be aspheric and can be easily made to be non-spherical, allowing more design parameter freedom which can be used to reduce aberrations and the number of the lens elements, so that the total track length of the photographing optical lens assembly can be reduced effectively.

The aforementioned arrangement of optical elements can effectively improve the image quality of the photographing optical lens assembly, reduce the sensitivity of the optical system and maintain the miniaturization of the photographing optical lens assembly.

DETAILED DESCRIPTION OF THE PREFERRED EMBODIMENTS

The structure, technical features and functionality of the present photographing optical lens assembly will be detailed as follows.

According to one aspect of the present invention, in the present photographing optical lens assembly, the focal length of the photographing optical lens assembly is f, the focal length of the first lens element is f1, and they satisfy the relation: $0.80 < f/f1 < 1.50$.

When the above relation is satisfied, the refractive power of the first lens element is more balanced so that the total track length of the optical system may be effectively controlled to maintain the miniaturization of the photographing optical lens assembly. The above relation also prevents high order spherical aberration and Coma from becoming too large, so that the image quality may be improved. Further, it will be preferable that f/f1 satisfies the relation: $1.00 < f/f1 < 1.30$.

According to another aspect of the present invention, in the present photographing optical lens assembly, the focal length of the photographing optical lens assembly is f, the focal length of the second lens element is f2, and they satisfy the relation: $-0.45 < f/f2 < 0.00$.

The above relation facilitates the correction of the chromatic aberration and the Petzal Sum of the optical system. Further, it will be preferable that f/f2 satisfies the relation: $-0.15 < f/f2 < 0.00$.

And it will be more preferable that f/f2 satisfies the relation: $-0.08 < f/f2 < 0.00$.

According to another aspect of the present invention, in the present photographing optical lens assembly, the radius of curvature of the object-side surface of the first lens element is R1, the radius of curvature of the image-side surface of the first lens element is R2, and they satisfy the relation: $0.45 < R1/R2 < 0.70$.

The above relation facilitates the correction of the spherical aberration of the photographing optical lens assembly. Further, it will be preferable that R1/R2 satisfies the relation: $0.50 < R1/R2 < 0.60$.

According to another aspect of the present invention, in the present photographing optical lens assembly, the radius of curvature of the object-side surface of the second lens element is R3, the radius of curvature of the image-side surface of the second lens element is R4, and they satisfy the relation: $0.05 < R3/R4 < 0.92$.

The above relation facilitates the correction of the chromatic aberration of the photographing optical lens assembly and enables the total track length of the optical system to be controlled effectively. Further, it will be preferable that R3/R4 satisfies the relation: $0.73 < R3/R4 < 0.92$.

According to another aspect of the present invention, in the present photographing optical lens assembly, the refractive index of the first lens element with positive refractive power is N1, and it satisfies the relation: $1.50 < N1 < 1.59$.

The above relation is favorable for selecting an appropriate optical plastic material for the first lens element, so that the photographing optical lens assembly may obtain better image quality.

According to another aspect of the present invention, in the present photographing optical lens assembly, the Abbe number of the first lens element is V1, and it satisfies the relation: $V1 > 50$.

The above relation facilitates the correction of the chromatic aberration of the photographing optical lens assembly.

According to another aspect of the present invention, in the present photographing optical lens assembly, the on-axis spacing between the first lens element and the second lens element is T12, the focal length of the photographing optical lens assembly is f, and they satisfy the relation: $0.05 < T12/f < 0.30$.

The above relation facilitates the correction of high order aberrations of the photographing optical lens assembly and contributes to the miniaturization of the optical system. Further, it will be preferable that T12/f satisfies the relation: $0.12 < T12/f < 0.17$.

According to another aspect of the present invention, in the present photographing optical lens assembly, the on-axis thickness of the first lens element is CT1, the on-axis thickness of the second lens element is CT2, and they satisfy the relation: $1.50 < CT2/CT1 < 2.20$.

The above relation enables the photographing optical lens assembly to obtain better image quality and contributes to the miniaturization of the photographing optical lens assembly.

According to another aspect of the present invention, the present photographing optical lens assembly further comprises an electronic sensor on which an object to be photographed is imaged. The total track length of the photographing optical lens assembly is TTL, which is defined as the on-axis spacing between the object-side surface of the first lens element and the image plane, the maximum image height of the photographing optical lens assembly is ImgH, which is defined as half of the diagonal line of the effective pixel area of the electronic sensor, and they satisfy the relation: $TTL/ImgH < 2.10$.

The above relation contributes to the miniaturization of the photographing optical lens assembly. Further, it will be preferable that TTL/ImgH satisfies the relation: $TTL/ImgH < 1.85$.

Preferred embodiments of the present invention will be illustrated as follows.

Figure 1:
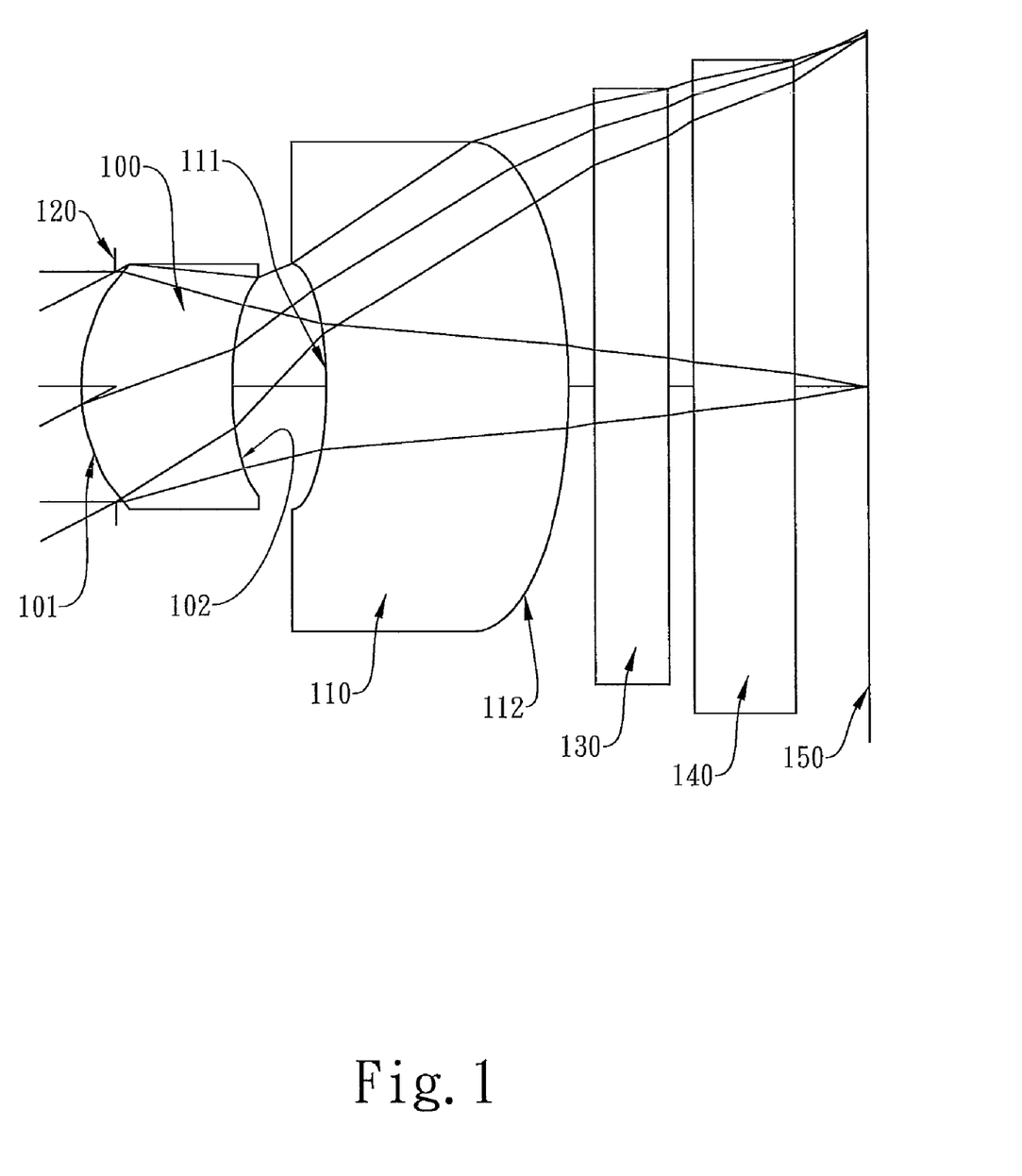
FIG. 1 shows a photographing optical lens assembly in accordance with a first embodiment of the present invention.
Figure 2:
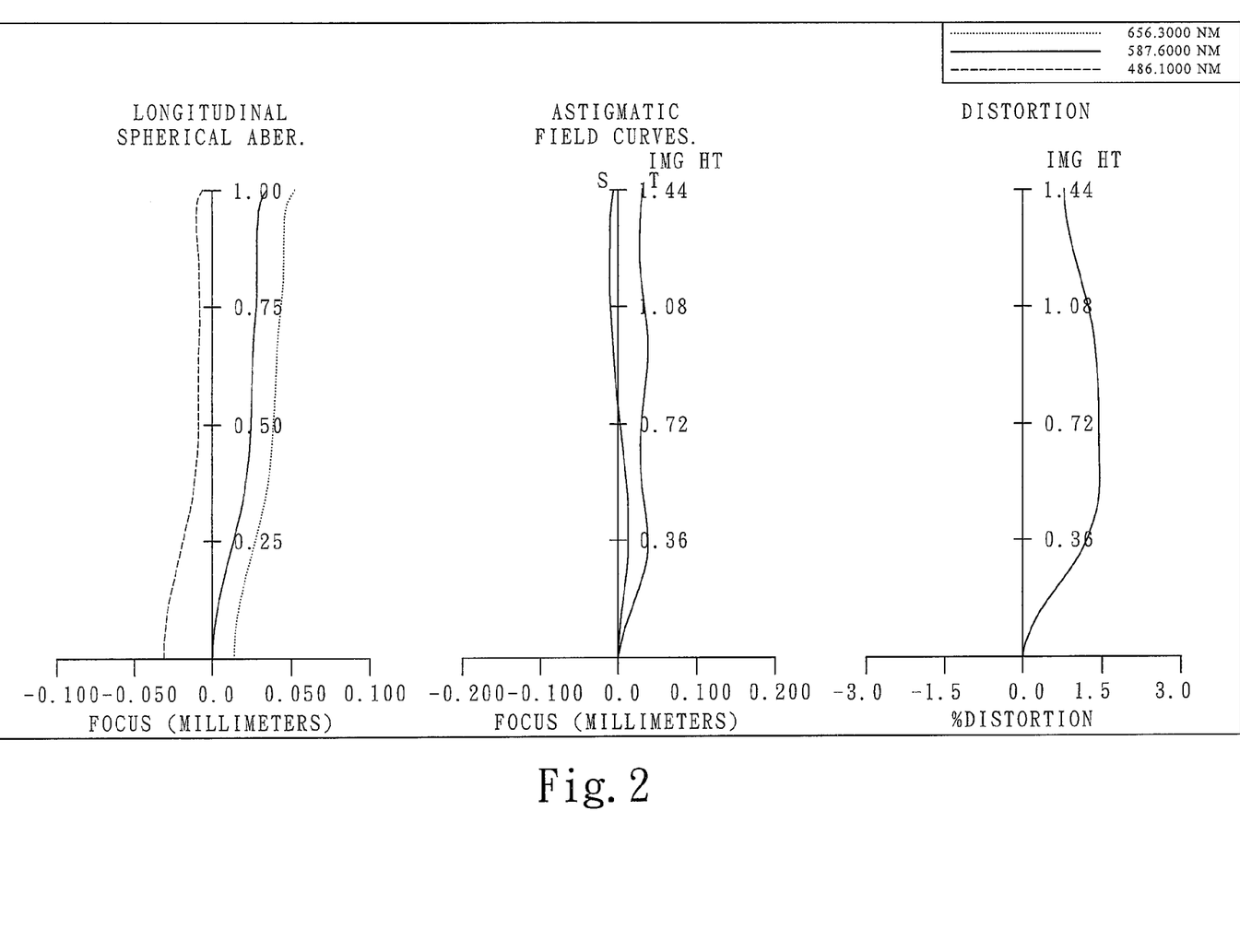
FIG. 2 shows the aberration curves of the first embodiment of the present invention.

FIG. 1 shows a photographing optical lens assembly in accordance with a first embodiment of the present invention, and FIG. 2 shows the aberration curves of the first embodiment of the present invention. The first embodiment of the present invention is a photographing optical lens assembly mainly comprising two lens elements with refractive power, in order from the object side to the image side, including: a plastic first lens element 100 with positive refractive power having a convex object-side surface 101 and a concave image-side surface 102, the object-side and image-side surfaces 101 and 102 thereof being aspheric; a plastic second lens element 110 with negative refractive power having a concave object-side surface 111 and a convex image-side surface 112, the object-side and image-side surfaces 111 and 112 thereof being aspheric; an aperture stop 120 located in front of the first lens element 100; an IR filter 130 located behind the second lens element 110; a sensor cover glass 140 located behind the IR filter 130, the sensor cover glass 140 having no influence on the focal length of the optical system; and an image plane 150 located behind the sensor cover glass 140.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing optical lens assembly, the focal length of the photographing optical lens assembly is f, the focal length of the first lens element 100 is f1, the focal length of the second lens element 110 is f2, and they satisfy the relations: f=2.69 mm, f/f1=1.20, f/f2=−0.04.

In the first embodiment of the present photographing optical lens assembly, the radius of curvature of the object-side surface 101 of the first lens element 100 is R1, the radius of curvature of the image-side surface 102 of the first lens element 100 is R2, the radius of curvature of the object-side surface 111 of the second lens element 110 is R3, the radius of curvature of the image-side surface 112 of the second lens element 110 is R4, and they satisfy the relations: R1/R2=0.55, R3/R4=0.81.

In the first embodiment of the present photographing optical lens assembly, the refractive index of the first lens element 100 is N1, and it satisfies the relation: N1=1.543.

In the first embodiment of the present photographing optical lens assembly, the Abbe number of the first lens element 100 is V1, the Abbe number of the second lens element 110 is V2, and they satisfy the relations: V1=56.5, |V1−V2|=0.0.

In the first embodiment of the present photographing optical lens assembly, the on-axis spacing between the first lens element 100 and the second lens element 110 is T12, the focal length of the photographing optical lens assembly is f, and they satisfy the relation: T12/f=0.14.

In the first embodiment of the present photographing optical lens assembly, the on-axis thickness of the first lens element 100 is CT1, the on-axis thickness of the second lens element 110 is CT2, and they satisfy the relation: CT2/CT1=1.62.

In the first embodiment of the present photographing optical lens assembly, the photographing optical lens assembly further comprises an electronic sensor on which an object to be photographed is imaged. The total track length of the photographing optical lens assembly is TTL, the maximum image height of the photographing optical lens assembly is ImgH, and they satisfy the relation: TTL/ImgH=2.04.

Figure 7:
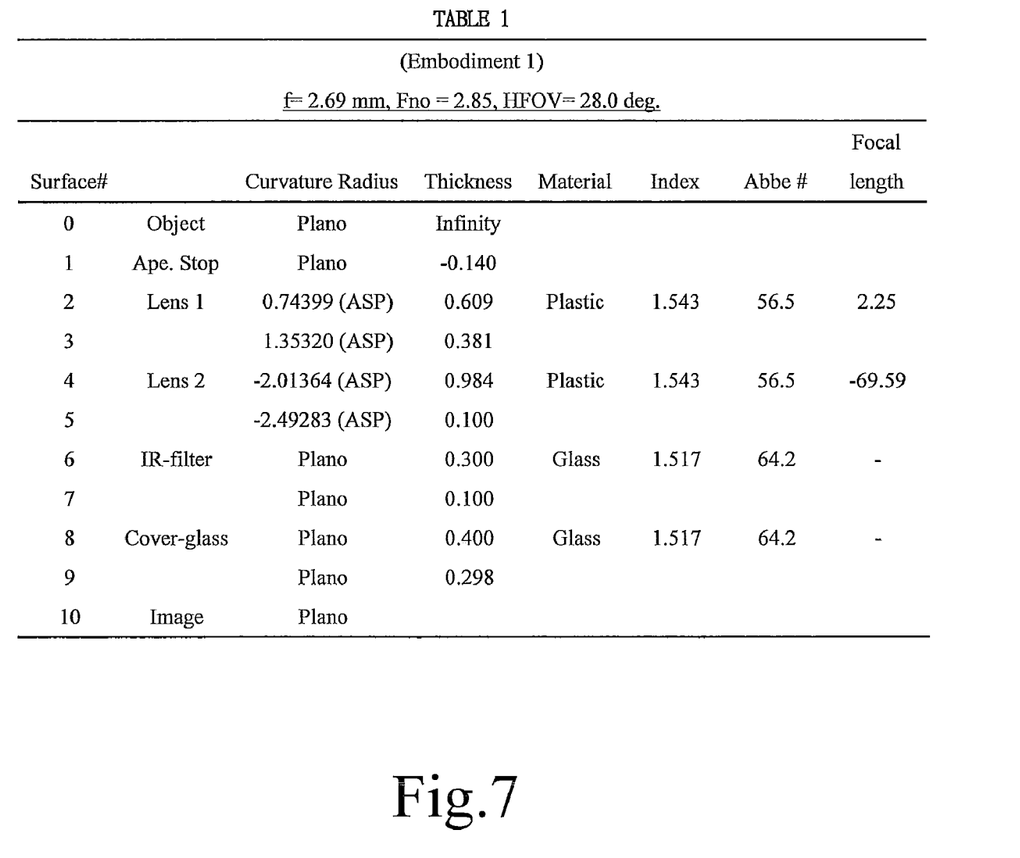
FIG. 7 is TABLE 1 which lists the optical data of the structure of the first embodiment.
Figure 8:
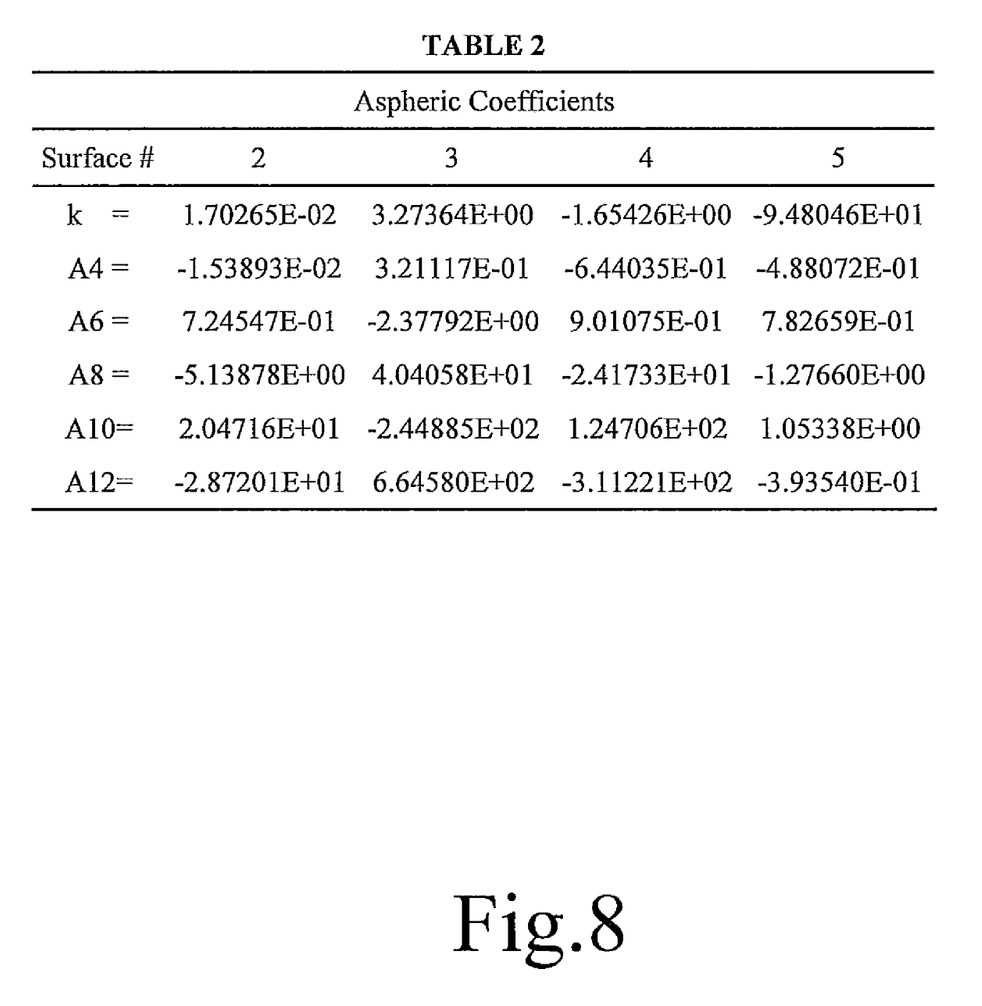
FIG. 8 is TABLE 2 which lists the aspheric surface data of the first embodiment.

The detailed data of the structure of the first embodiment is shown in TABLE 1, and the aspheric surface data is shown in TABLE 2, wherein the units of the radius of curvature, the thickness and the focal length are expressed in mm, and HFOV is half of the maximal field of view.

Figure 3:
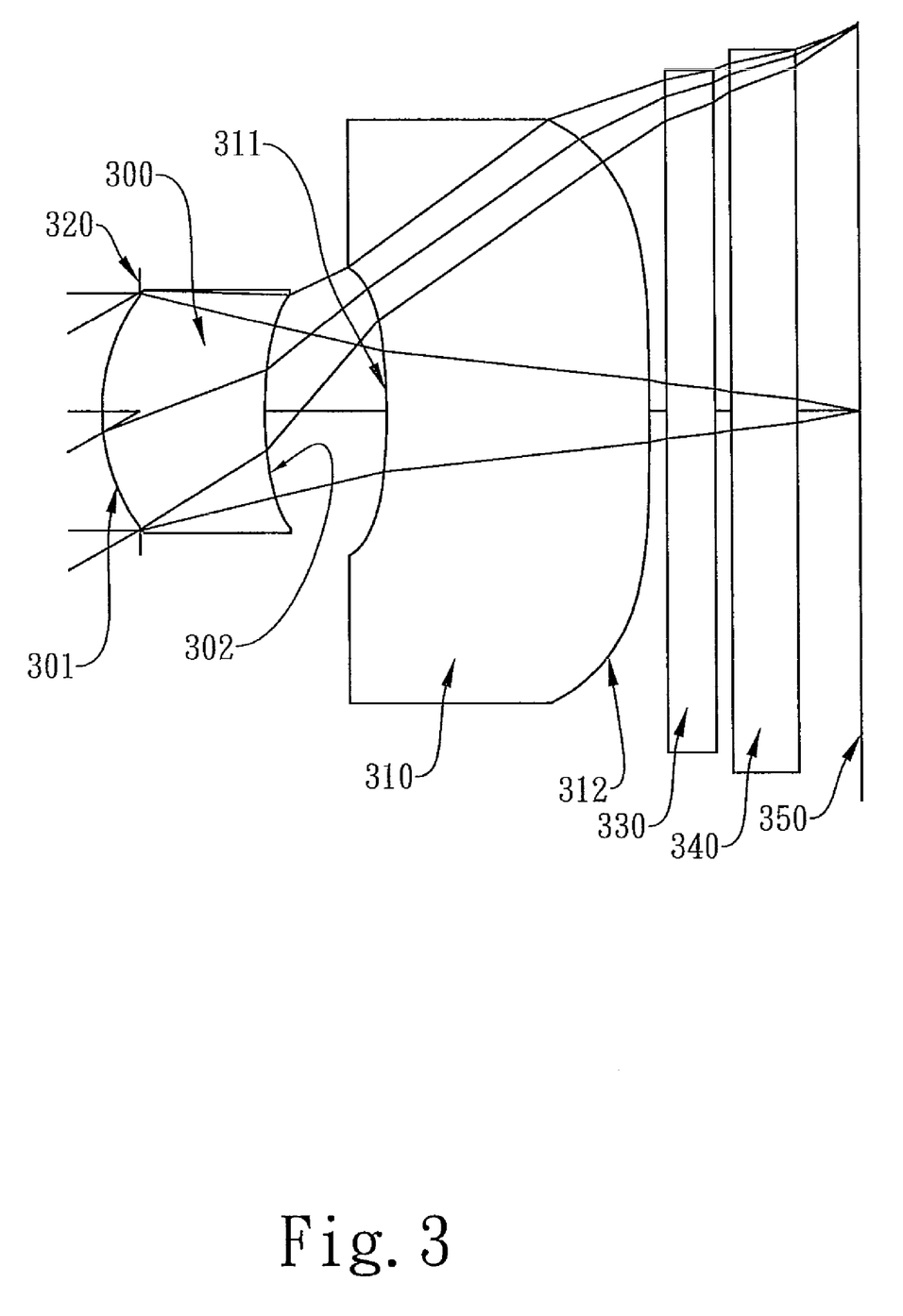
FIG. 3 shows a photographing optical lens assembly in accordance with a second embodiment of the present invention.
Figure 4:
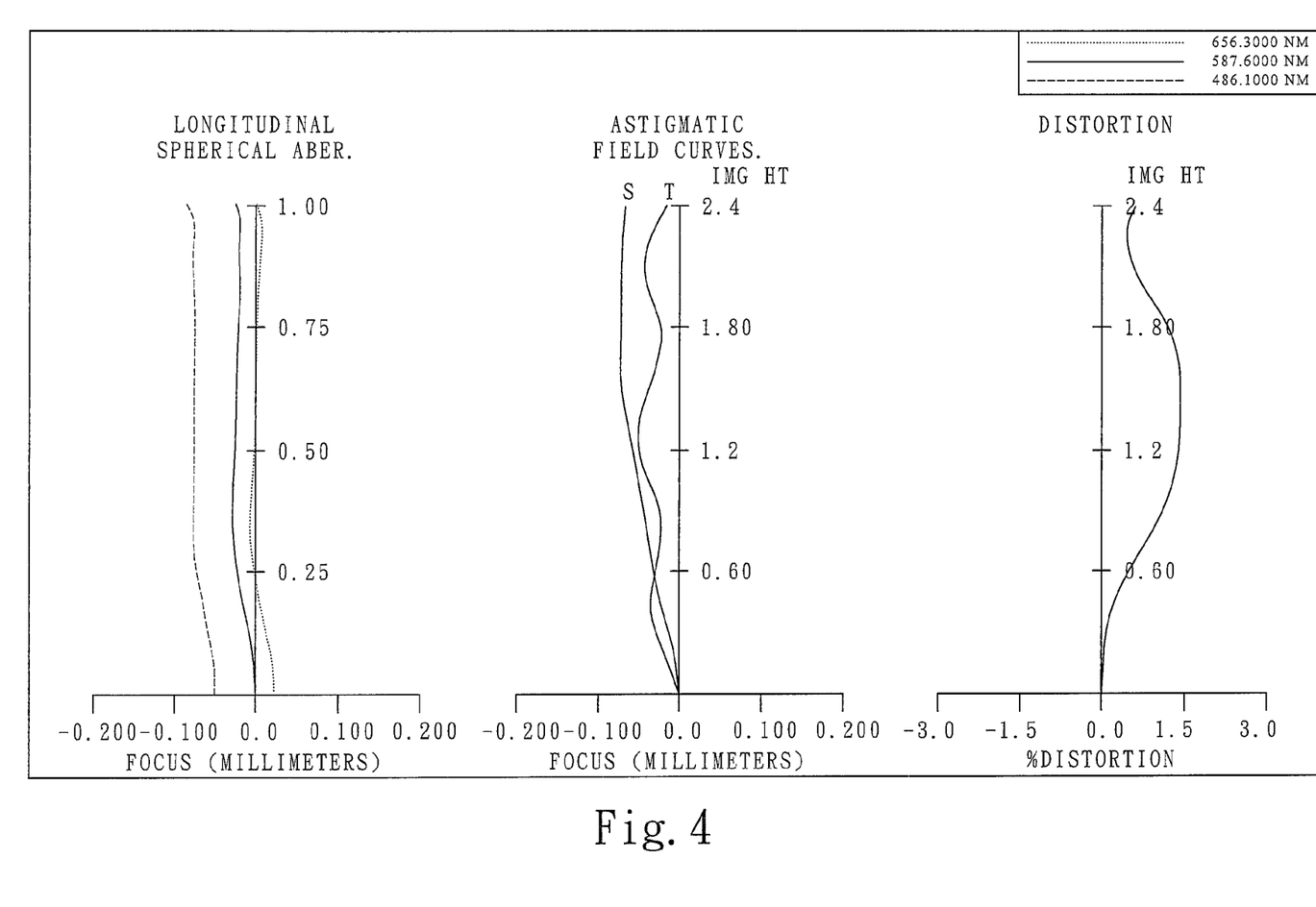
FIG. 4 shows the aberration curves of the second embodiment of the present invention.

FIG. 3 shows a photographing optical lens assembly in accordance with a second embodiment of the present invention, and FIG. 4 shows the aberration curves of the second embodiment of the present invention. The second embodiment of the present invention is a photographing optical lens assembly mainly comprising two lens elements with refractive power, in order from the object side to the image side, including: a plastic first lens element 300 with positive refractive power having a convex object-side surface 301 and a concave image-side surface 302, the object-side and image-side surfaces 301 and 302 thereof being aspheric; a plastic second lens element 310 with negative refractive power having a concave object-side surface 311 and a convex image-side surface 312, the object-side and image-side surfaces 311 and 312 thereof being aspheric; an aperture stop 320 located in front of the first lens element 300; an IR filter 330 located behind the second lens element 310; a sensor cover glass 340 located behind the IR filter 330, the sensor cover glass 340 having no influence on the focal length of the optical system; and an image plane 350 located behind the sensor cover glass 340.

The equation of the aspheric surface profiles of the second embodiment has the same form as that of the first embodiment.

In the second embodiment of the present photographing optical lens assembly, the focal length of the photographing optical lens assembly is f, the focal length of the first lens element 300 is f1, the focal length of the second lens element 310 is f2, and they satisfy the relations: f=4.17 mm, f/f1=1.19, f/f2=−0.34.

In the second embodiment of the present photographing optical lens assembly, the radius of curvature of the object-side surface 301 of the first lens element 300 is R1, the radius of curvature of the image-side surface 302 of the first lens element 300 is R2, the radius of curvature of the object-side surface 311 of the second lens element 310 is R3, the radius of curvature of the image-side surface 312 of the second lens element 310 is R4, and they satisfy the relations: R1/R2=0.49, R3/R4=0.21.

In the second embodiment of the present photographing optical lens assembly, the refractive index of the first lens element 300 is N1, and it satisfies the relation: N1=1.543.

In the second embodiment of the present photographing optical lens assembly, the Abbe number of the first lens element 300 is V1, the Abbe number of the second lens element 310 is V2, and they satisfy the relations: V1=56.5, |V1−V2|=0.0.

In the second embodiment of the present photographing optical lens assembly, the on-axis spacing between the first lens element 300 and the second lens element 310 is T12, the focal length of the photographing optical lens assembly is f, and they satisfy the relation: T12/f=0.18.

In the second embodiment of the present photographing optical lens assembly, the on-axis thickness of the first lens element 300 is CT1, the on-axis thickness of the second lens element 310 is CT2, and they satisfy the relation: CT2/CT1=1.62.

In the second embodiment of the present photographing optical lens assembly, the photographing optical lens assembly further comprises an electronic sensor on which an object to be photographed is imaged. The total track length of the photographing optical lens assembly is TTL, the maximum image height of the photographing optical lens assembly is ImgH, and they satisfy the relation: TTL/ImgH=1.84.

Figure 9:
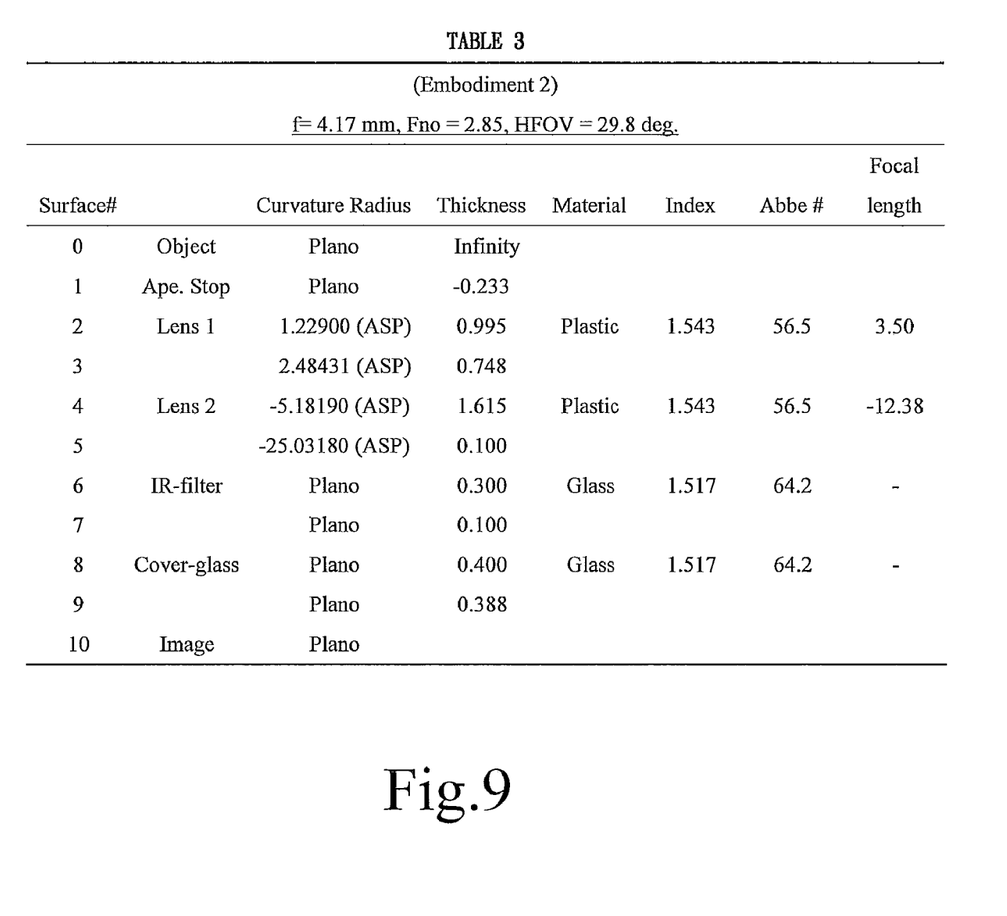
FIG. 9 is TABLE 3 which lists the optical data of the structure of the second embodiment.
Figure 10:
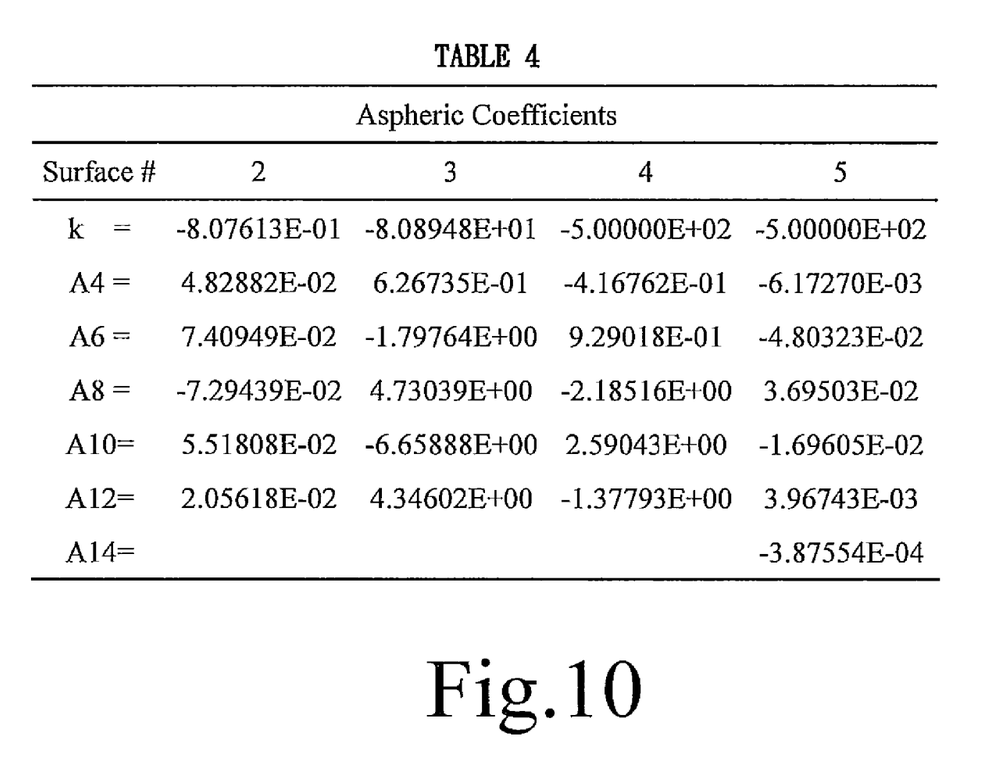
FIG. 10 is TABLE 4 which lists the aspheric surface data of the second embodiment.

The detailed data of the structure of the second embodiment is shown in TABLE 3, and the aspheric surface data is shown in TABLE 4, wherein the units of the radius of curvature, the thickness and the focal length are expressed in mm, and HFOV is half of the maximal field of view.

Figure 5:
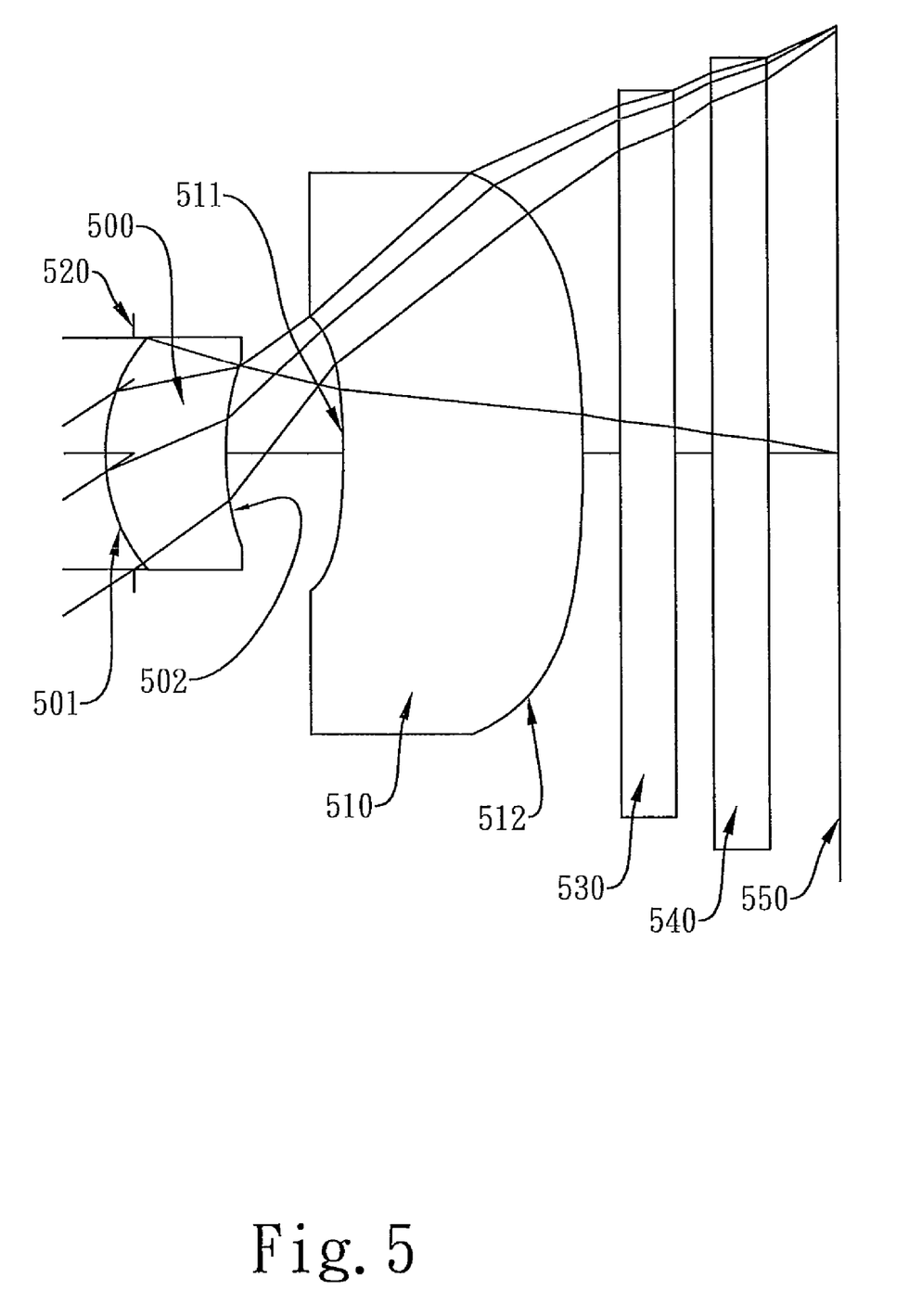
FIG. 5 shows a photographing optical lens assembly in accordance with a third embodiment of the present invention.
Figure 6:
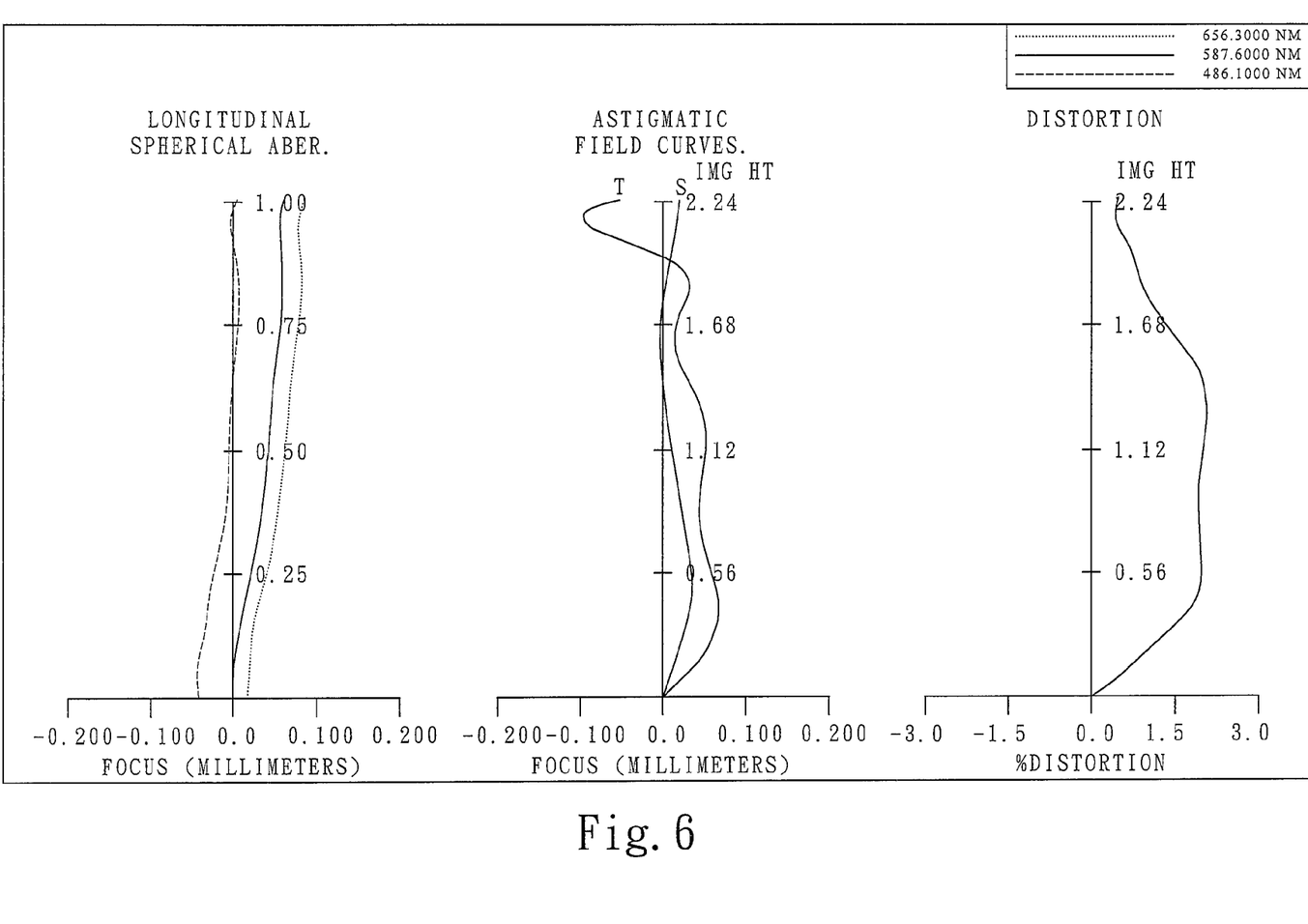
FIG. 6 shows the aberration curves of the third embodiment of the present invention.

FIG. 5 shows a photographing optical lens assembly in accordance with a third embodiment of the present invention, and FIG. 6 shows the aberration curves of the third embodiment of the present invention. The third embodiment of the present invention is a photographing optical lens assembly mainly comprising two lens elements with refractive power, in order from the object side to the image side, including: a plastic first lens element 500 with positive refractive power having a convex object-side surface 501 and a concave image-side surface 502, the object-side and image-side surfaces 501 and 502 thereof being aspheric; a plastic second lens element 510 with negative refractive power having a concave object-side surface 511 and a convex image-side surface 512, the object-side and image-side surfaces 511 and 512 thereof being aspheric; an aperture stop 520 located in front of the first lens element 500; an IR filter 530 located behind the second lens element 510; a sensor cover glass 540 located behind the IR filter 530, the sensor cover glass 540 having no influence on the focal length of the optical system; and an image plane 550 located behind the sensor cover glass 540.

The equation of the aspheric surface profiles of the third embodiment has the same form as that of the first embodiment.

In the third embodiment of the present photographing optical lens assembly, the focal length of the photographing optical lens assembly is f, the focal length of the first lens element 500 is f1, the focal length of the second lens element 510 is f2, and they satisfy the relations: f=3.53 mm, f/f1=1.17, f/f2=−0.12.

In the third embodiment of the present photographing optical lens assembly, the radius of curvature of the object-side surface 501 of the first lens element 500 is R1, the radius of curvature of the image-side surface 502 of the first lens element 500 is R2, the radius of curvature of the object-side surface 511 of the second lens element 510 is R3, the radius of curvature of the image-side surface 512 of the second lens element 510 is R4, and they satisfy the relations: R1/R2=0.56, R3/R4=0.66.

In the third embodiment of the present photographing optical lens assembly, the refractive index of the first lens element 500 is N1, and it satisfies the relation: N1=1.544.

In the third embodiment of the present photographing optical lens assembly, the Abbe number of the first lens element 500 is V1, the Abbe number of the second lens element 510 is V2, and they satisfy the relations: V1=55.9, |V1−V2|=0.0.

In the third embodiment of the present photographing optical lens assembly, the on-axis spacing between the first lens element 500 and the second lens element 510 is T12, the focal length of the photographing optical lens assembly is f, and they satisfy the relation: T12/f=0.18.

In the third embodiment of the present photographing optical lens assembly, the on-axis thickness of the first lens element 500 is CT1, the on-axis thickness of the second lens element 510 is CT2, and they satisfy the relation: CT2/CT1=1.99.

In the third embodiment of the present photographing optical lens assembly, the photographing optical lens assembly further comprises an electronic sensor on which an object to be photographed is imaged. The total track length of the photographing optical lens assembly is TTL, the maximum image height of the photographing optical lens assembly is ImgH, and they satisfy the relation: TTL/ImgH=1.69.

Figure 11:
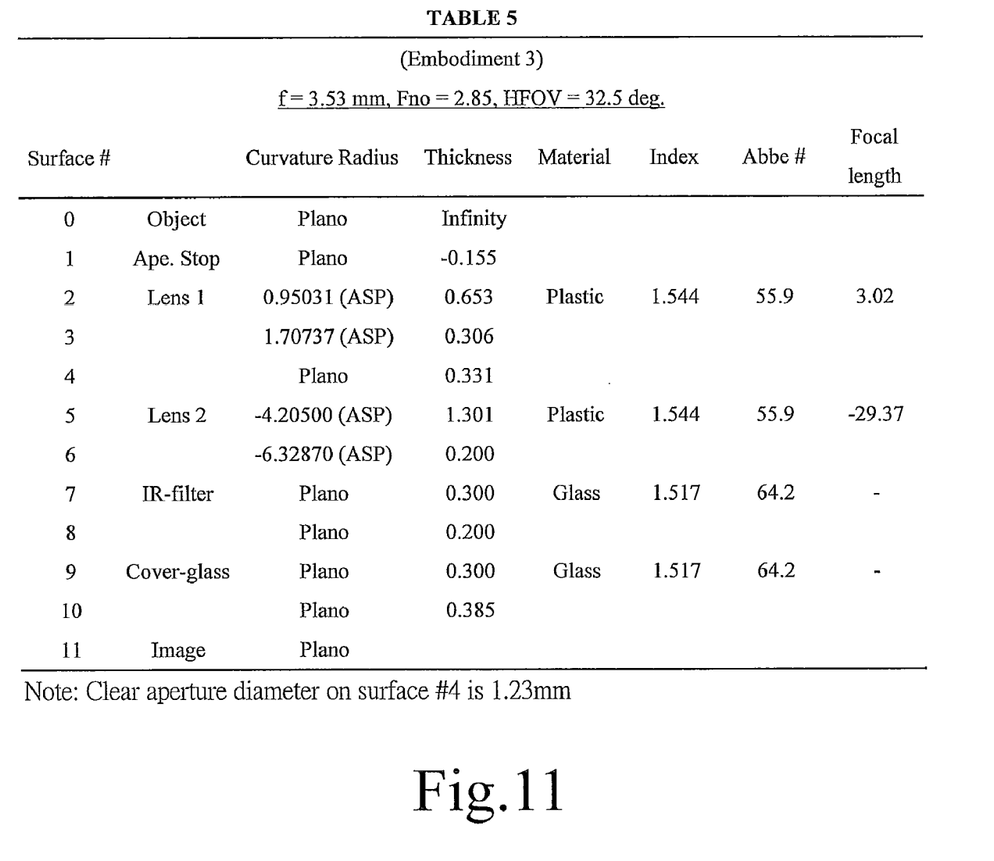
FIG. 11 is TABLE 5 which lists the optical data of the structure of the third embodiment.
Figure 12:
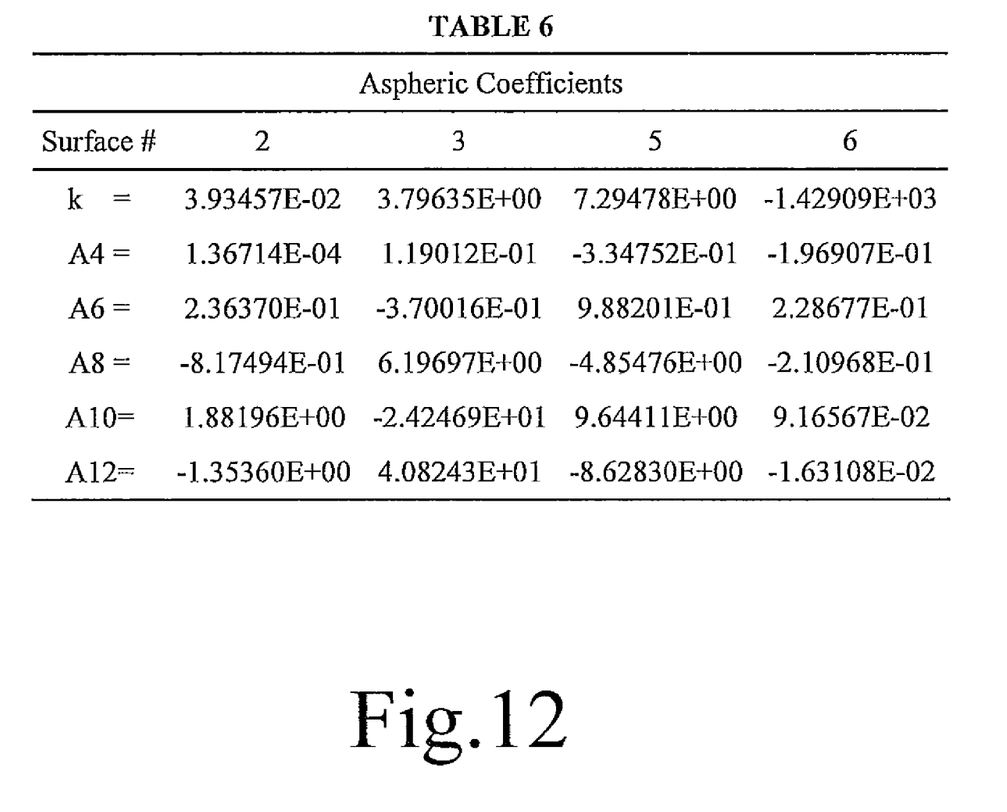
FIG. 12 is TABLE 6 which lists the aspheric surface data of the third embodiment.

The detailed data of the structure of the third embodiment is shown in TABLE 5, and the aspheric surface data is shown in TABLE 6, wherein the units of the radius of curvature, the thickness and the focal length are expressed in mm, and HFOV is half of the maximal field of view.

Figure 13:
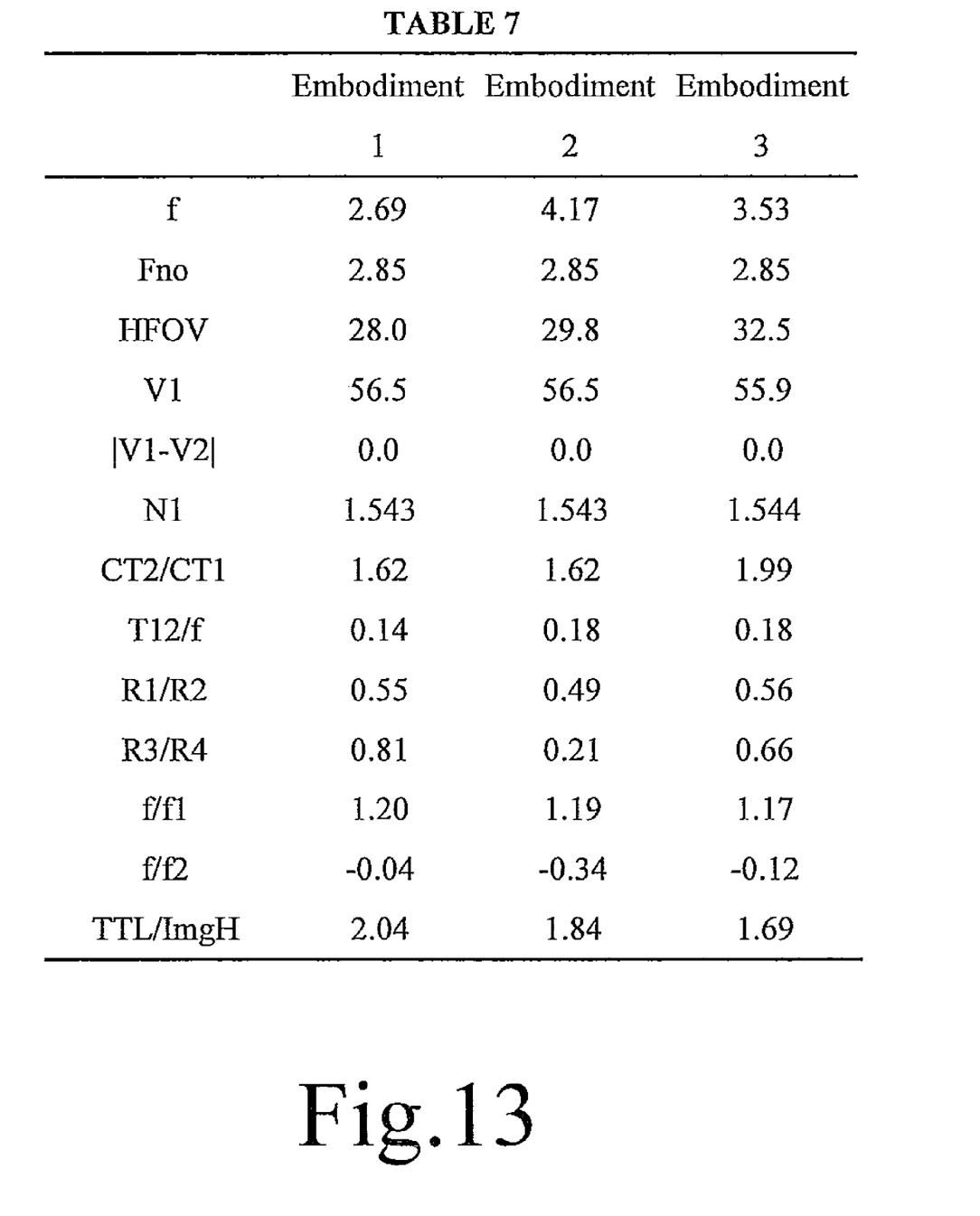
FIG. 13 is TABLE 7 which lists the data of the respective embodiments resulted from the equations.

It is to be noted that TABLES 1-6 (illustrated in FIGS. 7-12 respectively) show different data of the different embodiments, however, the data of the different embodiments are obtained from experiments. Therefore, any optical photographing system of the same structure is considered to be within the scope of the present invention even if it uses different data. Table 7 (illustrated in FIG. 13) shows the data of the respective embodiments resulted from the equations.

What is claimed is:

1. A photographing optical lens assembly comprising, in order from an object side to an image side:
   a first lens element with positive refractive power having a convex object-side surface and a concave image-side surface, the object-side and image-side surfaces thereof being aspheric;
   a second lens element with negative refractive power having a concave object-side surface and a convex image-side surface, the object-side and image-side surfaces thereof being aspheric; and
   an aperture stop located in front of the first lens element;
   wherein an Abbe number of the first lens element is V1, an Abbe number of the second lens element is V2, and they satisfy the relation: |V1−V2|<15; and wherein the number of the lens elements with refractive power of the photographing optical lens assembly is limited to two.

2. The photographing optical lens assembly according to claim 1 further comprising an electronic sensor on which an object to be photographed is imaged, wherein a total track length of the photographing optical lens assembly is TTL, a maximum image height of the photographing optical lens assembly is ImgH, and they satisfy the relation: TTL/ImgH<2.10.

3. The photographing optical lens assembly according to claim 2 further comprising an electronic sensor on which an object to be photographed is imaged, wherein the total track length of the photographing optical lens assembly is TTL, the maximum image height of the photographing optical lens assembly is ImgH, and they satisfy the relation: TTL/ImgH<1.85.

4. The photographing optical lens assembly according to claim 1, wherein both of the first lens element and the second lens element are made of plastic material.

5. The photographing optical lens assembly according to claim 4, wherein a focal length of the photographing optical lens assembly is f, a focal length of the first lens element is f1, and they satisfy the relation: 0.80<f/f1<1.50.

6. The photographing optical lens assembly according to claim 5, wherein the focal length of the photographing optical lens assembly is f, the focal length of the first lens element is f1, and they satisfy the relation: 1.00<f/f1<1.30.

7. The photographing optical lens assembly according to claim 4, wherein a focal length of the photographing optical lens assembly is f, a focal length of the second lens element is f2, and they satisfy the relation: −0.45<f/f2<0.00.

8. The photographing optical lens assembly according to claim 7, wherein the focal length of the photographing optical lens assembly is f, the focal length of the second lens element is f2, and they satisfy the relation: −0.15<f/f2<0.00.

9. The photographing optical lens assembly according to claim 8, wherein the focal length of the photographing optical lens assembly is f, the focal length of the second lens element is f2, and they satisfy the relation: −0.08<f/f2<0.00.

10. The photographing optical lens assembly according to claim 4, wherein a radius of curvature of the object-side surface of the first lens element is R1, a radius of curvature of the image-side surface of the first lens element is R2, and they satisfy the relation: 0.45<R1/R2<0.70.

11. The photographing optical lens assembly according to claim 10, wherein the radius of curvature of the object-side surface of the first lens element is R1, the radius of curvature of the image-side surface of the first lens element is R2, and they satisfy the relation: 0.50<R1/R2<0.60.

12. The photographing optical lens assembly according to claim 4, wherein a radius of curvature of the object-side surface of the second lens element is R3, a radius of curvature of the image-side surface of the second lens element is R4, and they satisfy the relation: 0.05<R3/R4<0.92.

13. The photographing optical lens assembly according to claim 12, wherein the radius of curvature of the object-side surface of the second lens element is R3, the radius of curvature of the image-side surface of the second lens element is R4, and they satisfy the relation: 0.73<R3/R4<0.92.

14. The photographing optical lens assembly according to claim 4, wherein a refractive index of the first lens element is N1, the Abbe number of the first lens element is V1, and they satisfy the relations: 1.50<N1<1.59, 50.0<V1.

15. The photographing optical lens assembly according to claim 4, wherein an on-axis spacing between the first lens element and the second lens element is T12, a focal length of the photographing optical lens assembly is f, and they satisfy the relation: 0.05<T12/f<0.30.

16. The photographing optical lens assembly according to claim 15, wherein the on-axis spacing between the first lens element and the second lens element is T12, the focal length of the photographing optical lens assembly is f, and they satisfy the relation: 0.12<T12/f<0.17.

17. The photographing optical lens assembly according to claim 4, wherein an on-axis thickness of the first lens element is CT1, an on-axis thickness of the second lens element is CT2, and they satisfy the relation: 1.5<CT2/CT1<2.2.

* * * * *